(12) United States Patent
Barsness et al.

(10) Patent No.: US 7,552,121 B2
(45) Date of Patent: Jun. 23, 2009

(54) AUTONOMIC LOCK ESCALATION IN AN SQL ENVIRONMENT

(75) Inventors: Eric L. Barsness, Pine Island, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 11/425,856

(22) Filed: Jun. 22, 2006

(65) Prior Publication Data

US 2007/0299814 A1    Dec. 27, 2007

(51) Int. Cl.
G06F 17/30 (2006.01)
G06F 13/00 (2006.01)
(52) U.S. Cl. .................... 707/8; 707/2; 707/3; 710/200
(58) Field of Classification Search .................... 707/3, 707/2, 200, 8; 710/200
See application file for complete search history.

(56) References Cited

U.S. PATENT DOCUMENTS 5,737,611 A * 4/1998 Vicik .......................... 710/200
6,418,438 B1 * 7/2002 Campbell ...................... 707/8
2004/0199512 A1 * 10/2004 Cornwell et al. ............... 707/9
2005/0234842 A1 * 10/2005 Lau et al. ....................... 707/1
2005/0289188 A1 * 12/2005 Nettleton et al. ............ 707/200

* cited by examiner

*Primary Examiner*—Etienne P LeRoux
*Assistant Examiner*—Thuy (Tiffany) Bui
(74) *Attorney, Agent, or Firm*—Patterson & Sheridan, LLP (57) ABSTRACT

Embodiments of the invention provide a method, article of manufacture, and an apparatus used to optimize the execution of a database query. One embodiment includes a computer-implemented method that includes the steps of receiving a query of a database, prior to executing the query, analyzing the query to select a locking strategy to use in executing the query, and executing the query using the selected locking strategy. Depending on the content of a particular query, or the status of a database, a query optimizer may determine whether to escalate from a row level locking strategy to a page level locking strategy when executing the data query.

17 Claims, 5 Drawing Sheets

FIG. 1

SELECT <columns>  FROM <Tables>  WHERE <conditions>
202             204            206
                                        ← 200

SELECT NAME, SALARY  FROM EMPLOYEE  WHERE SALARY > 1,000
         202             204              206

SELECT PART NAME, COST  FROM PART_TABLE  WHERE PART_ID=5???
         202                204                206

SELECT DATA_ITEM  FROM RARELY-USED-TABLE  WHERE<CONDITIONS>
       202              204                     206

AUTONOMIC LOCK ESCALATION IN AN SQL ENVIRONMENT

BACKGROUND OF THE INVENTION

1. Field of the Invention

Embodiments of the invention are generally related to computer database systems. More particularly, embodiments of the invention are related to evaluating a database query and selecting a database locking strategy prior to query execution.

2. Description of the Related Art

Databases are computerized information storage and retrieval systems. A relational database management system (DBMS) is a computer database management system that uses relational techniques for storing and retrieving data. Relational databases are computerized information storage and retrieval systems in which data in the form of tables are typically stored for use on disk drives or similar mass data stores. Each database table includes a set of rows (also referred to as records) spanning one or more columns.

A database query refers to a set of commands or clauses for retrieving data stored in a database. Database queries may come from users, application programs or remote systems. A query may specify which columns to retrieve data from, how to join columns from multiple tables, and conditions that must be satisfied for a particular data record to be included in a query result set. Current relational databases typically process queries composed in an exacting format specified by a query language. For example, the widely used query language SQL (short for Structured Query Language) is supported by virtually every database available today.

Internally, a database may store the records of a given table in one or more pages. For example, the DB2® database available from IBM is configured to store records using a page size of 4096 bytes. The size of a page may be adjusted for performance considerations. Each page may store a number of records for the given table. When database queries are executed, rows from a variety of pages may be accessed. If multiple users have access to the database, i.e., if multiple queries may be executed concurrently, then the actions of one query (e.g., a query writing to rows on a particular page), may disrupt the actions of another query (e.g., another query reading rows from that page). Accordingly, a DBMS will "lock" the records accessed as part of a given database query. While locked, only the query which "locked" a particular record (or page) may access that record (or page). A row level lock "locks" a single record. A page level lock "locks" each record on the page, and a table level lock "locks" each page with any records from the "locked" table.

Locking strategy may dramatically affect performance. For example, in an environment with many users, using row level locking is more advantageous as it only locks the record being requested, other records on the same page remain available to other queries being processed. However, page level locking is often superior, as it requires fewer locks and fewer internal structures to be created to manage the locks, and thus, allows queries to be executed more efficiently and quickly. Situations where page level locking is more advantageous are situations where the likelihood of locking "extra" rows will unlikely cause deadlock (i.e., two locks, each waiting for the other to release) or concurrency problems (i.e., a query being blocked from access to a page until the page is unlocked).

One common locking strategy used by DBMS is known as lock escalation. Lock escalation is the process of converting many fine-grain (i.e., row level) locks into fewer coarse-grain locks, reducing system overhead while increasing the probability of deadlock and concurrency contention. Lock escalation is done during execution time and certain thresholds must be reached before lock escalation is done. For example, in SQL Server, lock escalation is triggered:

when a single Transact-SQL statement acquires at least 5,000 locks on a single table or index; or when the number of locks in an instance of the DBMS exceeds memory or configuration thresholds.

If locks cannot be escalated because of lock conflicts, the DBMS periodically attempts to trigger lock escalation after 1,250 new locks are acquired. Other DBMS systems provide similar features.

One drawback to this approach, however, is that escalation occurs only during query execution, and only after a problem with row level locking is identified. Essentially this approach waits until performance is degraded before escalating to a page (or table) level locking strategy. By this time however, the DBMS is at best playing catch up once query execution is going poorly.

Accordingly, there is a need in the art for a database query optimization technique for selecting a locking strategy, prior to executing a database query.

SUMMARY OF THE INVENTION

Embodiments of the invention provide a method, system and article of manufacture for selecting an optimal locking strategy for executing a database query, prior to executing a given database query.

One embodiment of the invention includes a computer-implemented method of optimizing database query execution. The method generally includes receiving a query configured to be executed against a database containing data, and prior to executing the query, analyzing the query to select a locking strategy to use in executing the query, the locking strategy being selected from at least two different locking strategies, wherein the locking strategy specifies which of the data to prevent other queries from accessing when the query is executed. The method generally further includes executing the query using the selected locking strategy.

Another embodiment of the invention includes a computer-readable storage medium containing a program which, when executed, performs an operation. The operation generally includes receiving a query configured to be executed against a database containing data, and prior to executing the query, analyzing the query to select a locking strategy to use in executing the query, the locking strategy being selected from at least two different locking strategies, wherein the locking strategy specifies which of the data to prevent other queries from accessing when the query is executed. The operation generally further includes executing the query using the selected locking strategy.

Another embodiment of the invention includes a computing device having a processor and a memory containing a program for optimizing the execution of a database query, which, when executed, performs an operation. The program operation generally includes receiving a query configured to be executed against a database containing data, and prior to executing the query, analyzing the query to select a locking strategy to use in executing the query, the locking strategy being selected from at least two different locking strategies, wherein the locking strategy specifies which of the data to prevent other queries from accessing when the query is executed. The operation generally further includes executing the query using the selected locking strategy.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof, which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide a method, system and article of manufacture for selecting a locking strategy for a database query, prior to executing the database query. In some cases, a page level locking strategy may lead to more efficient query execution. At the same time, escalating to a page level locking may cause concurrency issues to occur, slowing overall database efficiency (i.e., preventing other queries from being executed while pages are locked). In one embodiment, a query optimizer may analyze a database query and the then current state of a database to determine which of two or more locking strategies to use for the query. In one embodiment, the query optimizer may be configured to determine whether to change a locking strategy for the query from a first locking strategy to a second locking strategy (e.g., change from a row-level locking strategy to a page (or table) level locking strategy).

Embodiments of the invention are described herein relative to the widely used SQL query language. However, the invention is not limited to the SQL query language; rather, embodiments of the invention may be adapted to optimize database queries composed in other query languages that use locking strategies as part of providing concurrent access to multiple users.

Further, in the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the computing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD/DVD-ROM disks readable by a CD/DVD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
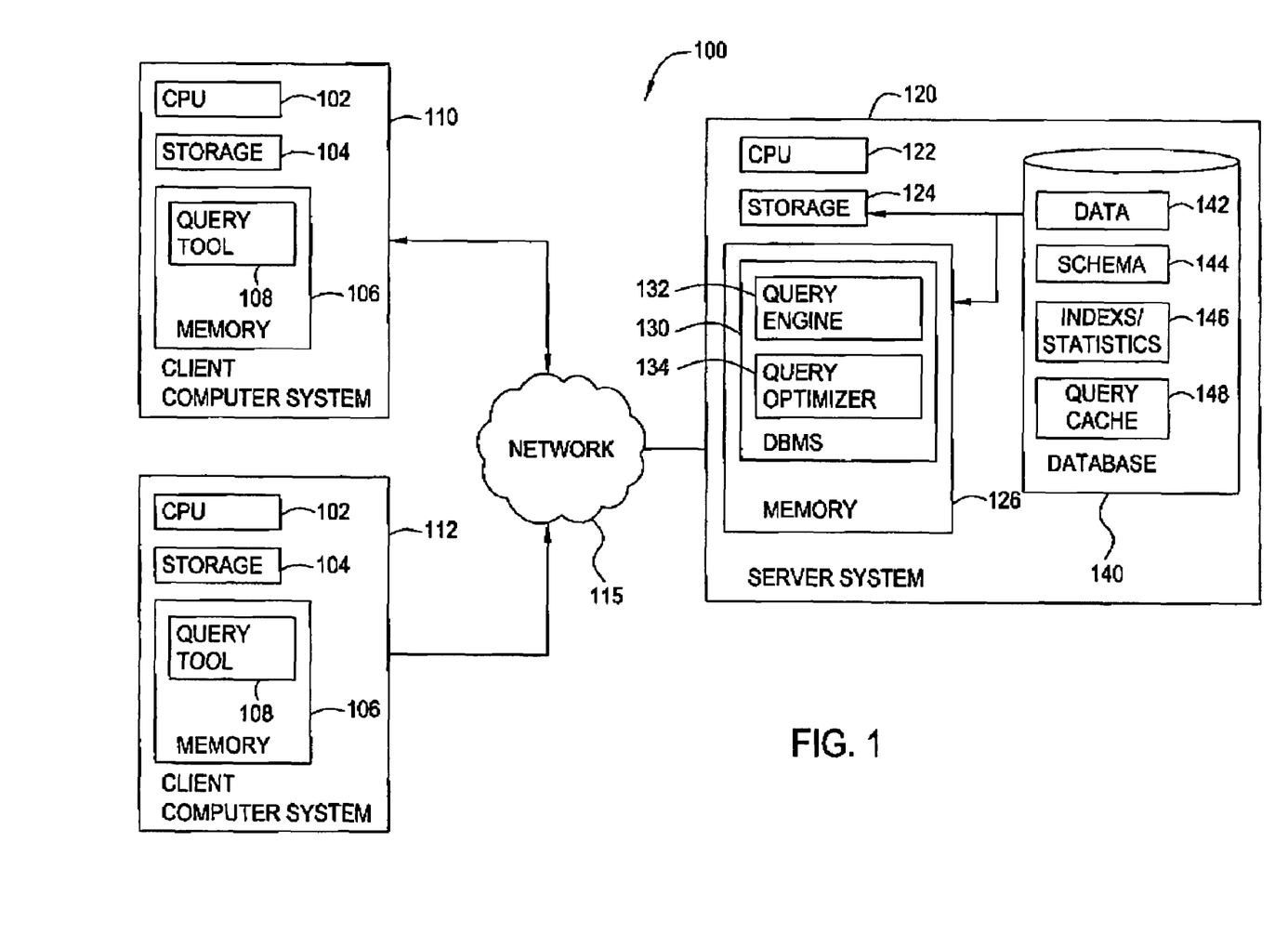
FIG. 1 is a block diagram that illustrates a client server view of a computing environment and database system, according to one embodiment of the invention.

FIG. 1 is a block diagram that illustrates a client server view of computing environment 100, according to one embodiment of the invention. As shown, computing environment 100 includes two client computer systems 110 and 112, network 115 and server system 120. The computer systems illustrated in environment 100 may represent existing computer systems, e.g., desktop computers, server computers laptop computers, tablet computers and the like. However, embodiments of the invention are not limited to any particular computing system, application or network architecture and may be adapted to take advantage of new computing systems as they become available. Additionally, those skilled in the art will recognize that the computer systems illustrated in FIG. 1 are simplified to highlight aspects of the present invention and that computing systems and networks typically include a variety of additional elements not shown in FIG. 1.

As shown, client computer systems 110 and 112 each include a CPU 102, storage 104 and memory 106, typically connected by a bus (not shown). CPU 102 is a programmable logic device that performs all the instructions, logic and mathematical processing performed in executing user applications (e.g., a query tool 108). Storage 104 stores application programs and data for use by client computer systems 110 and 112. Storage 104 includes hard-disk drives, flash memory devices, optical media and the like. Network 115 generally represents any kind of data communications network. Accordingly, network 115 may represent both local and wide area networks, including the Internet. Client computer systems 110 and 112 also include a query tool 108. In one embodiment, the query tool 108 is software application that allows end users to access information stored in a database (e.g., database 140). Query tool 108 may allow users to compose and submit a query to a database management system, which, in response, may be configured to process the query and return a set of query results.

In one embodiment, the query tool allows users to compose a database query without requiring that the user also be familiar with the underlying database query language (e.g., SQL). In such a case, the query tool 108 may be configured to generate a query in the underlying query language based on input provided by a user.

Server 120 includes a CPU 122, storage 124 and memory 126. As shown, server computer 120 also includes a database management system (DBMS) 130 that includes a query engine 132 and a query optimizer 134. The DBMS 130 includes software used to access, search, organize, analyze and modify information stored in database 140. The query engine 132 may be configured to process database queries submitted by a requesting application (e.g., a query generated using query tool 108) and to return a set of query results to the requesting application.

Query optimizer 134 may be configured to receive a query from the requesting application and optimize the query prior to its execution by the query engine 132. In one embodiment, the query optimizer 134 may determine whether to use a row level locking strategy, a page level locking strategy, or a table level locking strategy, prior to executing a particular database query. Note, however, the invention is not limited to these three specific locking strategies and other strategies may be used, based on, for example, a particular query or the capabilities of a particular DBMS 130. As described in greater detail herein, whether query optimizer 134 selects to escalate a locking strategy for a particular query may depend on the content of the particular query or on attributes of database 140.

Database 140 stores the data managed by DBMS 130. At various times elements of database 140 may be present in storage 124 and memory 126. In one embodiment, database 140 includes data 142, schema 144 and indexes/statistics 146. Data 142 represents the substantive data stored by database 140. Schema 144 provides description of how the data 142 is represented and organized within a database 140. For a relational database, the schema 144 specifies the tables, columns and relationships between tables. In addition, schema 144 may specify the data types of columns in a table and any constraints on a table or column. Index/statistics 146 may include various elements of metadata regarding database 140. For example, index/statistics 146 may store how many records are in a particular table, information such as the minimum, maximum, or average of values in the columns of a table.

Statistics 146 may also record information regarding queries submitted to the database 140. For example, information such as how many times a particular query has been submitted to the DBMS 130 or information related to how many rows of a table were used to process a particular query. Additional examples of statistics 146 include how often data from a particular table, page or record has been accessed. Similarly, statistics 146 may also record information related to the historical utilization of database 140. For example, the number of users at any given time may be recorded. Query cache 148 may cache query results or query plans related to previously executed database queries.

Figure 2A:
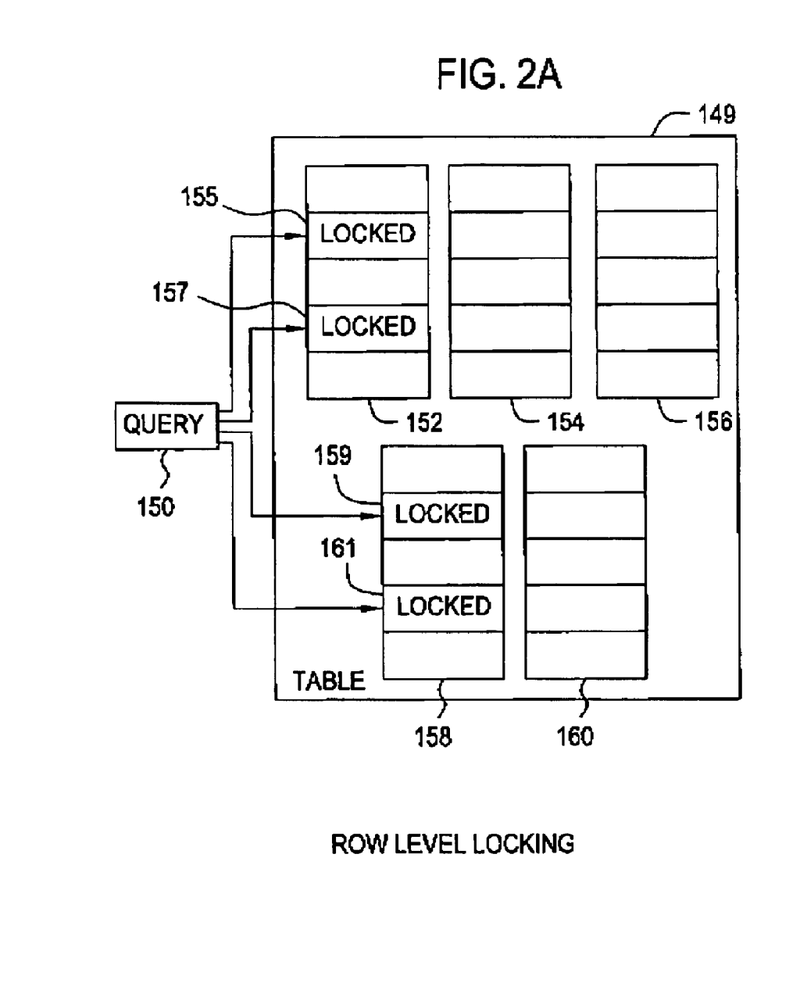
FIGS. 2A-2B illustrate different locking strategies that may be used when executing a database query, according to one embodiment of the invention.
Figure 2B:
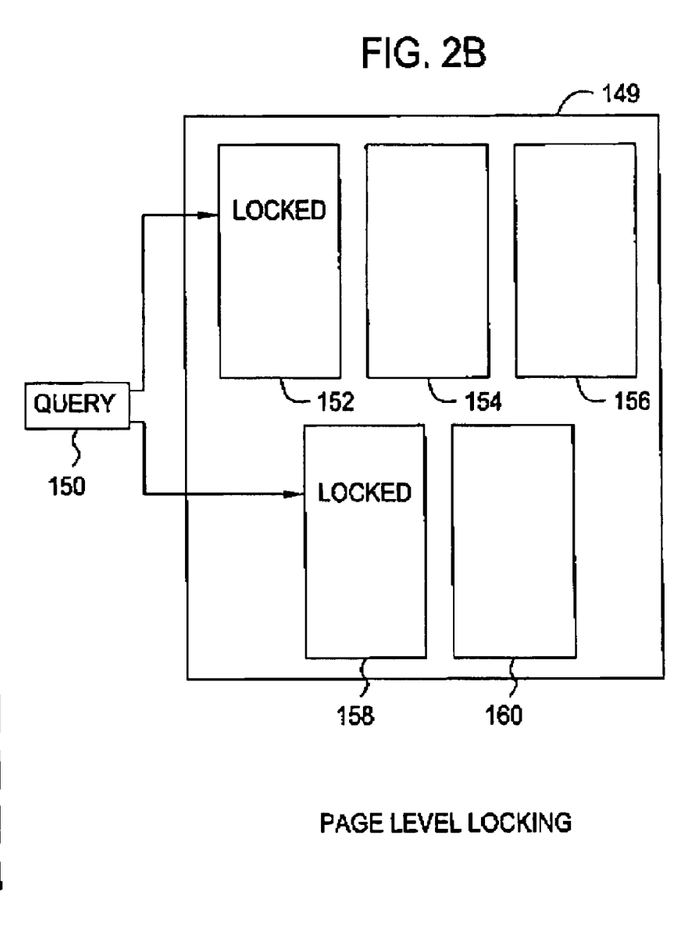

FIGS. 2A-2B illustrate an example of two locking strategies that may be used when executing a database query, according to one embodiment of the invention. Specifically, FIG. 2A illustrates a row-level locking strategy and FIG. 2B illustrates a page level locking strategy.

As shown in FIG. 2A a database query 150 accesses data from a database table 149. In this example, table 149 stores database records (i.e., rows of table 149) on pages 152, 154, 156, 158 and 160. The arrows are provided to indicate that query 150 requires access to data on pages 152 on 158 of table 149. Specifically, query 150 requires access to rows 155 and 157 on page 152 and rows 159 and 161 on page 158. Using a row-level locking strategy, only the rows actually accessed by query 150 are locked. Thus, other rows on pages 152 and 158 may be accessed by other clients accessing table 149, providing better concurrent access to table 149. At the same time, however, row level locking requires four separate database locks be created and enforced when executing query 150, which may slow down the execution of query 150 (and other queries being processed by DBMS 130).

In comparison, FIG. 2B illustrates query 150 being executed using a page level locking strategy. Query 150 still accesses rows from pages 152 and 158. In FIG. 2B, however, page level locking is used to lock all of the rows in these two pages. Thus, other rows located on pages 152 and 158 may not be accessed by other clients accessing table 149, even though data from these rows is not required to execute query 150. At the same time, however, page level locking requires only two separate database locks to be created and enforced when executing query 150, allowing query 150 to be executed more quickly. Table level locking (not shown) would lock each page (e.g., pages 152-160) on table 149 when executing query 150.

Thus, the locking strategy selected for a particular query may impact the efficiency of DBMS 130 executing that query, as well as the responsiveness of the DBMS 130 executing other queries submitted for execution. Embodiments of the invention respond to this trade-off by analyzing a database query prior to query execution and selecting a locking strategy to use when executing a database query. FIGS. 3A-3D illustrates exemplary database queries, for which different locking strategies may be appropriate. As shown in FIGS. 3A-3D, database queries 200, 225, 250 and 275 are composed using the SQL query language. As stated above, however, embodiments of the invention may be adapted for use with other query languages that provide locking strategies to protect data integrity and allow concurrent access to data in a database, whether now known or later developed.

Figure 3A:
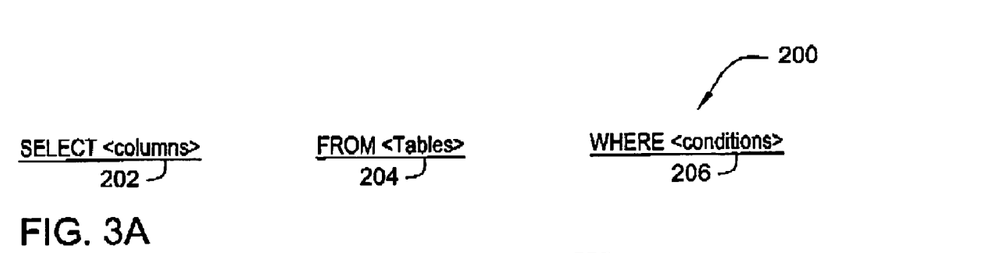
FIGS. 3A-3D illustrate exemplary database queries, for which a locking strategy may be selected when the queries are executed, according to one embodiment of the invention.

First, FIG. 3A illustrates the general structure of an SQL query. The SQL query 200 includes a SELECT clause 202, a FROM clause 204, and a WHERE clause 206. Generally, a SELECT clause 202 lists a set of one or more <columns> from which data records should be returned in response to a database query. FROM clause 204 is used to indicate from which <tables> the data is to be retrieved, as well as how different tables should be joined to each other. The WHERE clause 206 is used to specify one or more <conditions> used to determine which rows are to be returned in response to a given query. Those, skilled in the art will recognize that the SQL language supports additional clauses (e.g., HAVING, GROUP BY, ORDER BY).

Figure 3B:
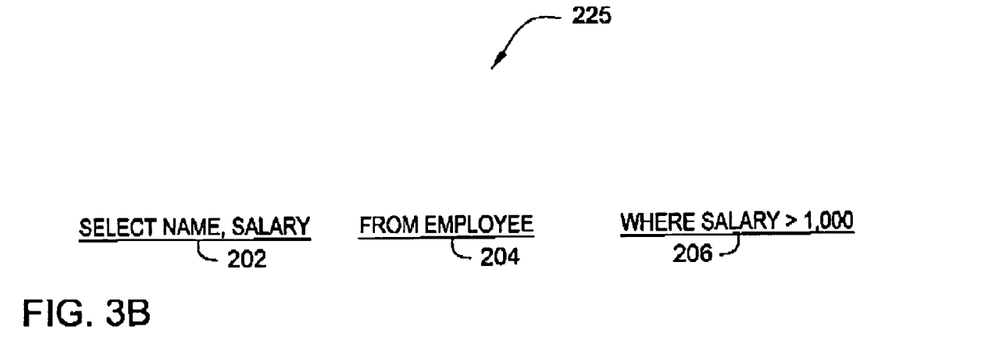
Figure 3C:
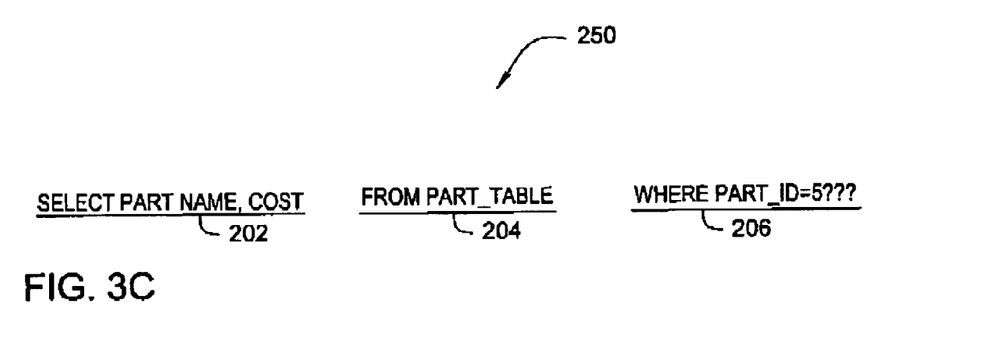
Figure 3D:
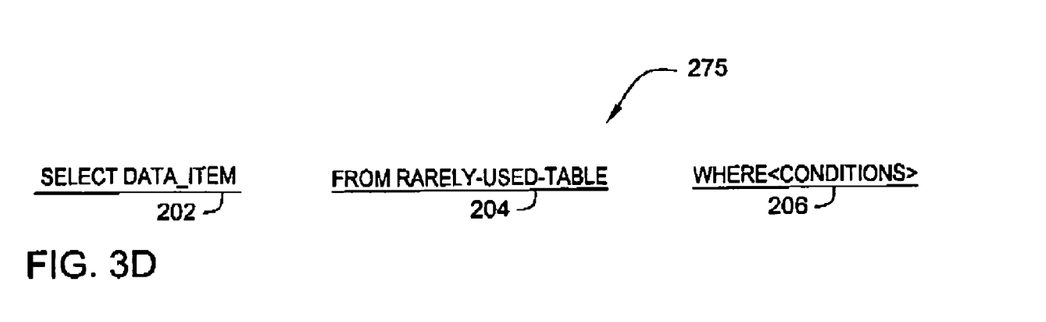

FIGS. 3B-3D illustrate exemplary database queries 225, 250, and 275 with examples of the <columns>, <tables>, and <conditions> values for the SELECT, FROM, and WHERE clauses of query 200. In one embodiment, when processing database queries 225, 250, and 275, query optimizer 134 may determine whether to use a row level, page level, or other locking strategy prior to executing these database queries. The specific examples included in database queries 225, 250 and 275 are described in greater detail below in conjunction with the method illustrated in FIG. 5.

Figure 4:
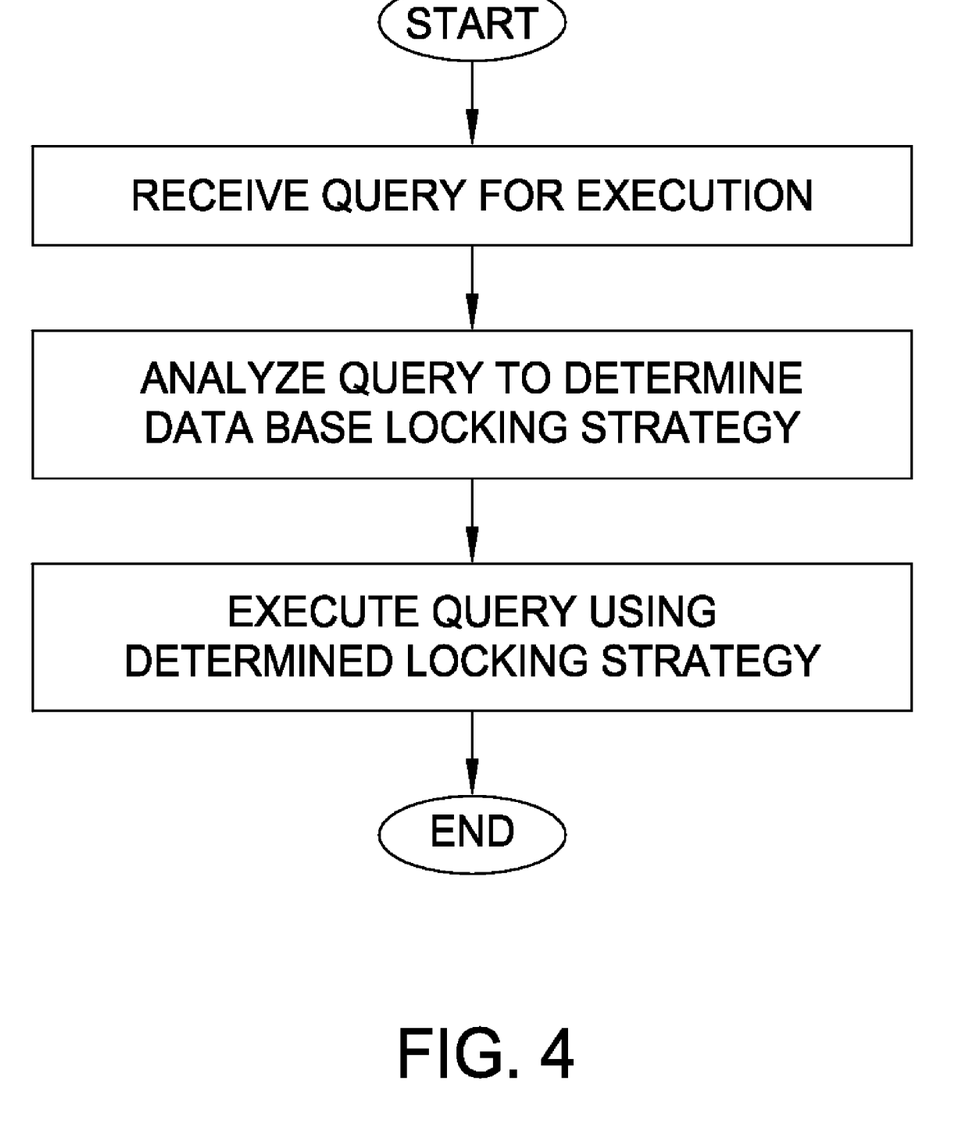
FIG. 4 illustrates a method for executing a database query, according to one embodiment of the invention.

FIG. 4 illustrates a method 400 for processing a database query, according to one embodiment of the invention. The method 400 begins at step 405 when the DMBS 130 receives a database query for execution. In one embodiment, the query may be received over network 115 from query tool 108.

At step 410, the query engine 132 may be configured to parse the query received at step 405 and determine a database locking strategy, prior to executing the database query. Additionally, the query engine 132 may be configured to record query statistics and add the query to cache 148. For example, query statistics may be gathered to determine how frequently a given query is executed, the number of rows evaluated or returned in query results, or what tables, or columns, or conditions are referenced by a particular query. This information may be used to help determine what locking strategy to use for subsequent queries For example, if a query is configured to retrieve data from a table that is accessed very infrequently, then the simpler page locking strategy may be more effective. This is because concurrency issues only occur when two queries need access to the same page at relatively the same time. Further, query statistics may also provide a feedback mechanism for the query optimizer 134 to analyze whether a database locking strategy selected at step 410 proved to be an efficient choice for the query received at step 405. Thus, the locking strategies selected by query optimizer 134 may be fine-tuned over time.

After selecting a locking strategy, at step 415, the query engine 132 executes the query and returns query results to the requesting application. This includes creating and enforcing locks to rows, pages and/or tables, according to the locking strategy selected at step 410. Additionally, query engine 132 may update database indexes and statistics 146 based on the results of a query.

Figure 5:
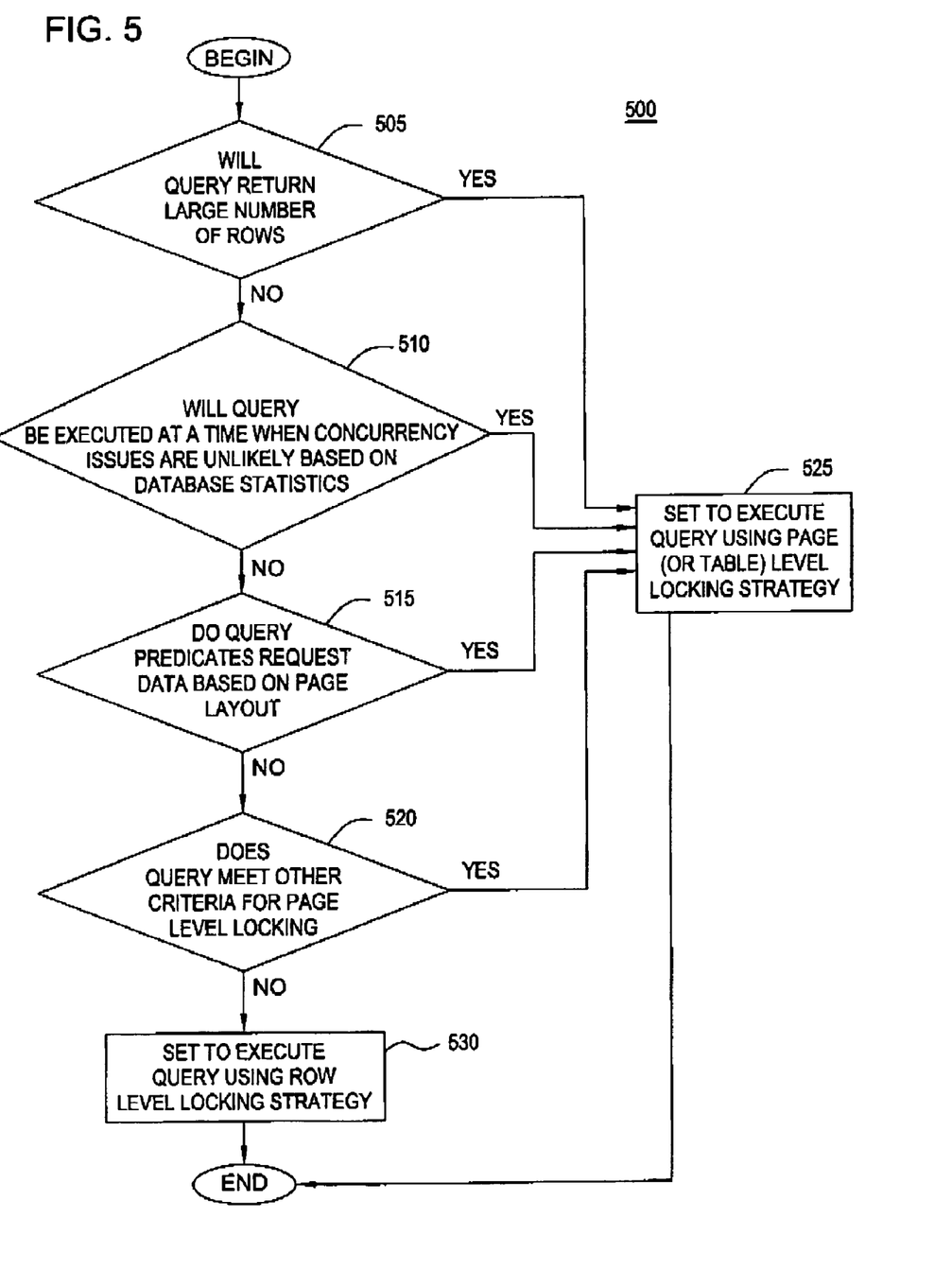
FIG. 5 illustrates a method for selecting a database locking strategy when executing a database query, according to one embodiment of the invention.

FIG. 5 illustrates a method for selecting a database locking strategy when executing a database query, according to one embodiment of the invention.

At step 505, the query optimizer 134 may determine whether a query will return a large number of rows from any single table referenced in the query. Generally, if a query returns more than half of the rows from a table, then at least half of the pages on which the rows are recorded are likely to be locked. In such a case, it is likely to be more efficient to use page level locking when executing such a query. As an example of this, the query 225 illustrated in FIG. 3B retrieves the name and salary records of employees where the salary is greater than $1,000. Assume for this example that the database stores records related to employees of a large company. In such a case, virtually all rows from the EMPLOYEE table are likely to be both evaluated and returned, in which case the query optimizer 134 may escalate the locking strategy from row level to page level (or table level) locking, and the method 500 may proceed to step 525 where page level locking is selected.

Conversely, if the WHERE clause 206 is modified to specify "where employee_ID=1234" then only a single row needs to be locked in order to execute database query 225, in which case query optimizer 134 would not escalate the locking strategy from row level to page level (or table level) locking. In one embodiment, results obtained from previous executions of a query may be used to estimate how many rows a given query may return. For example, if executing a query in the query cache 148, and the last several times this query was executed the result set size was over 5000 rows, then the query optimizer 134 may escalate the locking strategy to use the page level locking rather than the row level locking. The threshold for escalating from row level locking to page level locking may depend on how many rows a query is expected to return, or what percentage of rows from a given table a query is expected to return, and may be tailored to suit the needs in a particular case.

Returning to the method 500, if the query optimizer 134 does not escalate to page level locking based on the number of rows a query is expected to return, then at step 510, the query optimizer 134 may determine to escalate a locking strategy based on database statistics 146. For example, database query 275 illustrated in FIG. 3D includes a FROM clause 204 to retrieve data from a table illustratively named "RARELY-USED-TABLE." If database statistics 146 indicate a low probability of two requests for data from this table being received in a short period of time then query optimizer 134 may escalate the locking strategy, in which case the method 500 may proceed to step 525 where page level locking is selected.

Similarly, if database utilization is very low when a query is received, then query optimizer 134 may escalate the locking strategy from row level to page level (or table level) locking, and the method 500 may proceed to step 525 where page level locking is selected. For example query optimizer 134 may determine how many other database threads are active, how many of those threads are currently accessing a table referenced by the query being evaluated, the estimated length of the locks and the query execution time, and the like, in order to select whether to escalate to page level locking. Like the threshold for escalating locking strategy based on the number of rows a query is expected to return, escalating to page level locking based on database statistics may be a matter of experience and tailored to suit the needs in a particular case.

At step 515, the query optimizer 134 may determine whether to escalate a locking strategy from row level to page (or table) level locking based on whether query predicates in a "WHERE" clause 206 (or other clause) of the query are evaluated based on page layout.

For example, database query 250 illustrated in FIG. 3C includes a WHERE clause 206 specifying to retrieve records from a $PART_{13}$ TABLE where the $PART_{13}$ ID in a given record matches the pattern of "5???." Assume that information in the $PART_{13}$ TABLE includes part IDs for parts ranging from 0000-9999. In such a case, the query requires access to parts with part IDs having a sequence of 5000-5999. If pages are stored based on the sequence of part IDs, then a number of contiguous pages are evaluated when executing this query, and only pages with the records corresponding to part ID 5000 and part ID 5999 include other records with part numbers outside of the range specified in WHERE clause 206. In such a case, the pages storing records for parts with the part IDs between 5000-5999 in the "PART_TABLE" may be locked without causing any unnecessary concurrency problems, in which case the query optimizer 134 may escalate the locking strategy, in which case the method 500 may proceed to step 525 where page level locking is selected.

Returning to the method 500 of FIG. 5, at step 520, the query optimizer 134 may determine whether to escalate a locking strategy based on other criteria appropriate for a particular database, database schema and query environment. If so, query optimizer 134 may escalate the locking strategy from row level to page level (or table level) locking, and the method 500 may proceed to step 525 where page level locking is selected.

Otherwise, if none of the requirements (e.g., the determinations made in steps 505, 510, 515 and 520) for escalating a locking strategy to page (or table) level locking are satisfied, then the method 500 proceeds to step 530 where the query optimizer 134 sets the query to be executed using row level locking 530. In either case (row level or page level locking) statistics regarding query execution may be recorded for the query when it is executed.

In one embodiment, the query optimizer may re-asses whether the "pro-active" page level lock escalation is still appropriate in certain cases. For example, the query optimizer may occasionally select row level locking for query and compare overall system behavior vs. page level locking of the same query.

As described above in regards to steps 505, 510, 515 and 520 of the method 500, the query optimizer 134 may evaluate whether to escalate a locking strategy for query execution, based on a variety of different criteria. Those skilled in the art will recognize, however, that the different evaluation mechanisms shown being in steps 505-520 are provided as examples of query evaluation mechanisms that may be used to evaluate whether to escalate to page level locking for a particular database query and that other evaluation mechanism may be used.

Advantageously, embodiments of the invention provide a mechanism to determine whether to escalate a query locking strategy, prior to executing a given database query. Doing so may improve system performance, as the system avoids switching from row-level locking to page (or table) level locking in the middle of performing a database query. Thus, rather than waiting for query execution performance to degrade, embodiments of the invention analyze a query and determine whether escalation of the locking strategy is appropriate, in advance of executing that query.

While the foregoing is directed to embodiments of the present invention, other and further embodiments of the invention may be devised without departing from the basic scope thereof, and the scope thereof is determined by the claims that follow.

What is claimed is:

1. A computer-implemented method of optimizing database query execution; comprising:
   receiving a query configured to be executed against a database containing data, wherein the query has been previously executed against the database, and wherein statistics reflecting a number of records required to execute the query were recorded during a prior execution of the query;
   prior to executing the query, analyzing the query to select a locking strategy to use in executing the query, the locking strategy being selected from at least two different locking strategies, wherein the locking strategy specifies which of the data to prevent other queries from accessing when the query is executed, wherein the analyzing comprises determining whether to escalate from a row level locking strategy to a page level locking strategy by evaluating:
      the number of records evaluated during execution of the query during the prior execution of the query, and
      an estimated number of records required to execute the query;
      upon determining at least one of the number of records and the estimated number of records exceeds a specified threshold, escalating to at least the page level locking strategy;
      upon determining that neither the number of records nor the estimated number of records exceeds the specified threshold, selecting the row level locking strategy; and
   executing the query using the selected locking strategy.

2. The method of claim 1, wherein determining whether to escalate from a row level locking strategy to a page level locking strategy further comprises evaluating database statistics regarding a current utilization of the database.

3. The method of claim 1, wherein determining whether to escalate from a row level locking strategy to a page level locking strategy further comprises determining whether the query will access data based on a page layout of pages in the database.

4. The method of claim 1, wherein determining whether to escalate from a row level locking strategy to a page level locking strategy further comprises evaluating database statistics regarding how frequently a table or column referenced by the query is accessed.

5. The method of claim 1, wherein determining whether to escalate from a row-level locking strategy to a page level locking strategy comprises performing calculations regarding a particular database column referenced by the query.

6. The method of claim 1, wherein the database is a relational database and the query is composed in the Structured Query Language (SQL).

7. The method of claim 1, wherein analyzing the query to select a locking strategy further comprises, determining whether to escalate from a row level locking strategy or a page level locking strategy to a table level locking strategy.

8. A computer-readable storage medium containing a program which performs an operation, the operation comprising:
   receiving a query configured to be executed against a database containing data, wherein the query has been previously executed against the database, and wherein statistics reflecting a number of records required to execute the query were recorded during a prior execution of the query;
   prior to executing the query, analyzing the query to select a locking strategy to use in executing the query, the locking strategy being selected from at least two different locking strategies, wherein the locking strategy specifies which of the data to prevent other queries from accessing when the query is executed, wherein the analyzing comprises determining whether to escalate from a row level locking strategy to a page level locking strategy by evaluating:
      the number of records evaluated during execution of the query during the prior execution of the query, and
      an estimated number of records required to execute the query; upon determining at least one of the number of records and the estimated number of records exceeds a specified threshold, escalating to at least the page level locking strategy;
      upon determining neither the number of records nor the estimated number of records exceeds the specified threshold, selecting the row level locking strategy; and
   executing the query using the selected locking strategy.

9. The computer-readable storage medium of claim 8, wherein determining whether to escalate from a row level locking strategy to a page level locking strategy further comprises evaluating database statistics regarding a current utilization of the database.

10. The computer-readable storage medium of claim 8, wherein determining whether to escalate from a row level locking strategy to a page level locking strategy further comprises evaluating database statistics regarding how frequently a table or column referenced by the query is accessed.

11. The computer-readable storage medium of claim 8, wherein determining whether to escalate from a row-level locking strategy to a page level locking strategy further comprises performing calculations regarding a particular database column referenced by the query.

12. The computer-readable storage medium of claim 8, wherein the database is a relational database and the query is composed in the Structured Query Language (SQL).

13. The computer-readable storage medium of claim 8, wherein determining whether to escalate from a row level locking strategy to a page level locking strategy further comprises determining whether the query will access data based on a page layout of pages in the database.

14. A computing device, comprising:
   a processor; and
   a memory containing a program for optimizing the execution of a database query, which, when executed, performs an operation, comprising:
      receiving a query configured to be executed against a database containing data, wherein the query has been previously executed against the database, and wherein statistics reflecting a number of records required to execute the query were recorded during a prior execution of the query,
      prior to executing the query, analyzing the query to select a locking strategy to use in executing the query, the locking strategy being selected from at least two different locking strategies, wherein the locking strategy specifies which of the data to prevent other queries from accessing when the query is executed, wherein the analyzing comprises determining whether to escalate from a row level locking strategy to a page level locking strategy by evaluating:
         the number of records evaluated during execution of the query during the prior execution of the query; and
         an estimated number of records required to execute the query,
      upon determining at least one of the number of records and the estimated number of records exceeds a specified threshold, escalating to at least the page level locking strategy,
      upon determining neither the number of records nor the estimated number of records exceeds the specified threshold, selecting the row level locking strategy, and
      executing the query using the selected locking strategy.

15. The computing device of claim 14, wherein determining whether to escalate from a row level locking strategy to a page level locking strategy further comprises evaluating database statistics regarding a current utilization of the database.

16. The computing device of claim 14, wherein determining whether to escalate from a row level locking strategy to a page level locking strategy further comprises evaluating database statistics regarding how frequently a table or column referenced by the query is accessed.

17. The computing device of claim 14, wherein determining whether to escalate from a row-level locking strategy to a page level locking strategy further comprises performing calculations regarding a particular database column referenced by the query.

* * * * *